June 6, 1961 A. BEZEMER ET AL 2,987,373
PROCESS FOR MANUFACTURING POLYALKYLENE TEREPHTHALATE THREADS
Filed Oct. 29, 1959

ARIE BEZEMER
KURT SAGASSER
INVENTORS

BY *[signature]*
ATTORNEY

United States Patent Office

2,987,373
Patented June 6, 1961

2,987,373
PROCESS FOR MANUFACTURING POLYALKYLENE TEREPHTHALATE THREADS
Arie Bezemer and Kurt Sagasser, Arnhem, Netherlands, assignors, by mesne assignments, to N.V. Onderzoekingsinstituut Research, Arnhem, Netherlands, a corporation of the Netherlands
Filed Oct. 29, 1959, Ser. No. 849,632
6 Claims. (Cl. 18—54)

This invention relates to a process for the manufacture of polyalkylene terephthalate threads, and more particularly to the manufacture of heavy denier, highly polymeric polyethylene terephthalate threads.

In the prior art, highly polymeric polyalkylene terephthalate and especially polyethylene terephthalate threads are formed by extrusion. Shortly after extrusion, the freshly formed threads are introduced into a liquid cooling and solidifying bath where they are guided through the bath by one or more thread guides, rollers or deflecting members. The cooled and solidified threads are removed from the bath and stretched a few times their original length.

In the production of heavy denier or thick threads, that is, threads of a diameter of 0.5 to 1.0 mm., by the above process, certain disadvantages have occurred. The denier or thickness of the threads so produced is not uniform and the threads are non-circular in their cross section. Such non-uniformity is particularly undesirable when the threads are to be used in gauze, acid resistant sieves or as string in musical instruments. In addition, it has been found that such threads after repeated use will develop fine cracks on the thread surfaces which result in a reduction in strength of the threads.

It is therefore an object of this invention to provide a process for the manufacture of polyalkylene terephthalate threads which are free of the difficulties of the prior art.

It is a further object of this invention to provide a process for manufacturing heavy denier polyethylene terephthalate threads.

An additional object of this invention is to provide a process for the manufacture of heavy denier polyethylene terephthalate threads that are of uniform denier and cross-section.

A further object of this invention is to provide a process for manufacturing heavy denier polyethylene terephthalate threads that are free of cracks on their surfaces.

These and other objects will become apparent from the following detailed description.

It has surprisingly been found that the foregoing objects may be accomplished by altering for the first time the passage of the freshly spun threads through the liquid cooling bath where the temperature thereof corresponds to the second order transition point of the threads. The freshly extruded threads as they are passed through the cooling bath are guided around thread guides, rollers or deflecting members.

The desired results may be obtained if the thread temperature and/or bath temperature at the point where the thread first contacts a thread guide, etc., corresponds to the second order transition point of the threads, i.e., 69° C.

It has also been found that the formation of fine cracks on the thread surfaces may be prevented by heating the threads while drawing them and then heating them at a higher temperature while the threads are subjected to a constant tension. A further improvement may be obtained if the threads in the area between the extrusion device and first thread guide, etc. are subjected to a constant tension.

The second order transition point definition may be found in Fibres From Synthetic Polymers, Elsevier Publishing Company, 1953, at page 322. It is that temperature at which various properties change rather sharply. These properties are coefficient of expansion, specific heat, thermal conductivity, compressibility, modulus of elasticity, and dielectric constant. For polyethylene terephthalate it is at 69° C.

The point at which the passage of the threads through the bath is altered for the first time will be referred to as the first deflecting point. This is the point on the thread guide, roller, etc., where the threads change direction. It is this point at which the temperature of the threads and/or bath should coincide with the second order transition point of the threads. Preferably the temperature of the threads should coincide with the second order transition point. However, the desired results may be obtained if the bath temperature also coincides and may even be obtained if only the bath temperature coincides with the thread second order transition point.

There are several methods by which the temperature of the threads and the cooling and solidifying bath may be controlled. Thus the thread temperature may be controlled to insure that it is at the second order transition point as it reaches the first deflecting point. In addition, the cooling bath temperature may also be controlled in order that it coincides with the second order transition point of the threads at the first deflecting point.

The simplest way is to adjust the first deflecting point. This may be accomplished by movably mounting the first thread guide, roller, etc., in the cooling bath. Another method is to adjust the height of the cooling liquid above the first thread guide (first deflecting point) because the greater the height the closer the second order transition point of the thread lies to the extruder spinning plate. This, of course, requires that the spinning plate be positioned above and not to the side of the cooling bath. It is customary to position this plate above the cooling bath.

An additional method is to adjust the temperature of the polymer which is not as desirable as other methods because of additional changes which would have to be made in the process. A further method is to adjust the temperature of the cooling liquid that is introduced into the cooling liquid container. In such a method the higher the temperature the greater the distance between the spinning plate and the second order transition point of the threads.

In the preferred embodiment of this invention, the first thread contacting guide, roller, etc., is movably mounted in the cooling liquid. This method results in additional improvement in cross-section and uniformity of denier or thickness by maintaining a constant tension on the threads between the spinning plate and the first deflecting point, i.e., first thread contacting guide, roller, etc.

The thread contacting guides, rollers or deflecting members in the cooling bath may be circular in cross-section or may have other conventionally curved surfaces. The preferred first thread contacting or guiding member should have a large radius of curvature, for example, a radius of curvature of about 10 centimeters. The other thread contacting or guiding members may have the same, larger, or smaller radii of curvature than the first thread contacting member. The thread contacting or guiding members may be fixed, freely rotatable or positively driven.

In this process the freshly formed threads are introduced into the cooling bath and proceed in a substantially vertical direction through the bath to the first thread contacting guide. At this point, the threads pass over the guide surface and proceed in a substantially horizontal direction to the second thread guide, etc. Here they pass over the guide or roller surface and proceed at an acute angle relative to the horizontal out of the cooling bath. Other guides or rollers may be placed in this path in order that the thread travel may be diverted.

In the customary process, the threads obtained by spinning are removed from the collection means and drawn to about four times the original length in order that the strength may be increased. Normally the threads are heated to about 100° C. during the drawing operation. As pointed out above, fine cracks tend to form on the surface of these drawn threads. It has been found that this difficulty may be eliminated or substantially eliminated by heating the drawn threads to 120° C. while their length remains constant, that is, the threads are under tension during the heating.

A further improvement is obtained by this heating in that shrinkage of the threads is reduced which in turn prevents an undesirable increase in elongation. This heating may be by steam, electricity, infra-red radiation, or any conventional means.

In this invention the cooling and solidifying medium may be any liquid which does not attack the polyalkylene terephthalate. Since the sharp cooling of the thread in this bath requires a critical positioning of the first deflecting point, it is undesirable to use a cooling liquid whose boiling point approximates the second order transition temperature of the polyalkylene terephthalate threads. Thus the liquid should have a boiling point considerably above this temperature. The preferred liquid, therefore, is water. It should be understood that other liquids meeting the above requirements may also be used.

The following is a detailed description of one embodiment of this invention taken in conjunction with the accompanying drawings in which.

Figure 1:
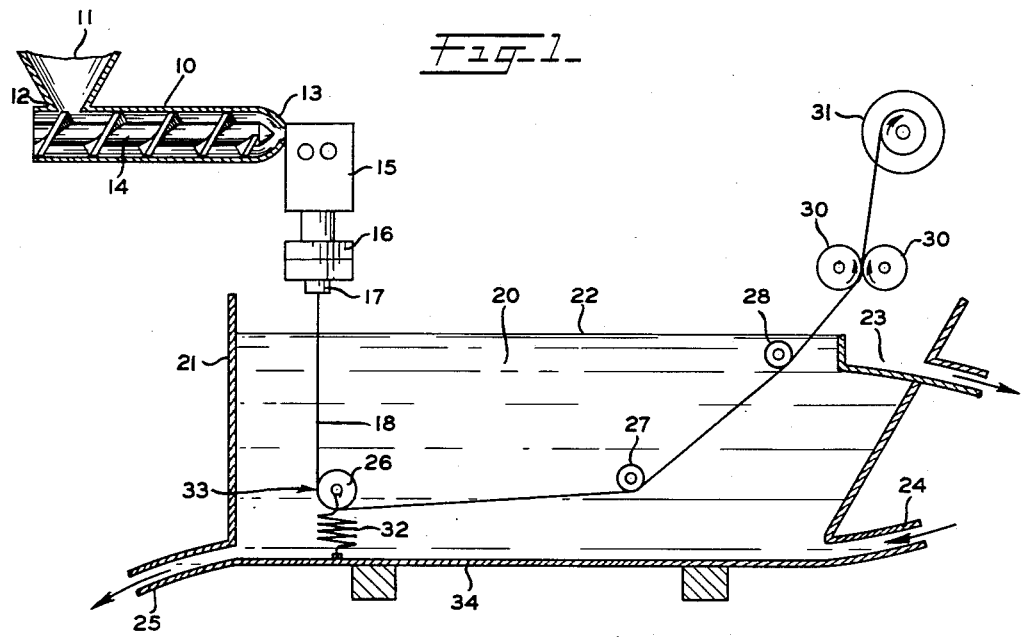
FIGURE 1 is a vertical sectional view of one embodiment of this invention.

Referring now to the drawings, reference numeral 10 denotes an extruder in which the polyalkylene terephthalate is introduced through hopper 11. The polymer is melted in extruder 10 by conventional heating means (not shown) and conveyed from the entrance 12 of extruder 10 to its exit 13 by screw 14. The polymer flows from exit 13 to metering and pressure pump 15 which is of conventional design.

Pump 15 supplies the polymer at a constant rate to a spinning assembly 16 containing a spinning plate 17 having one spinning orifice. It should be understood that more than one orifice may be used for spinning more than one thread simultaneously. The extruder, metering pump and spinning assembly are of conventional design and it should be understood that other methods of spinning polyalkylene terephthalate threads may be used equally well in this invention.

The molten polymer is extruded in the form of a thread into a liquid bath 20 contained in vessel 21. The level 22 of liquid 20 is determined by overflow port 23 positioned on the end of vessel 21 opposite the point of thread introduction as is shown in FIGURE 1. Vessel 21 is also provided with a supply pipe 24 on the same end as overflow port 23 and a discharge pipe 25 on the end of thread introduction. Thus the flow of liquid (as indicated by the arrows) through the bath is countercurrent to the thread travel. It should be understood that the flow of liquid may be changed so as to run concurrently with the thread travel without appreciably affecting the desired results.

Three stationary thread guides 26, 27 and 28 are mounted in vessel 21 below liquid level 22. It should be understood that thread rollers or other thread guiding and contacting members may be substituted for guides 26, 27 and 28. Thread 18 passes over a portion of the surface of guides 26, 27 and 28 as it proceeds through liquid bath 20. This is more clearly shown in FIGURE 1. Thread 18 is drawn through the bath and around guides 26, 27 and 28 by rollers 30 which rotate in opposite directions as shown by the arrows in order that thread 18 may be pulled through liquid bath 20. Thread so removed is wound on conventional collection reel 31.

Guide 26, which is the first thread guiding and contacting guide, is movably mounted on vessel 21 by way of spring 32 attached to the axis of guide 26 and the vessel bottom 34. Spring 32 is adjustable in order that constant tension may be maintained on thread 18 between spinning plate 17 and guide 26 and, more importantly, in order that the point 33 where thread 18 first changes its direction of travel may be made to coincide with the second order transition point of the threads. As pointed out previously, another way of accomplishing the latter result is to regulate the temperature and/or flow of the liquid in vessel 21 in order that the temperature of the liquid 20 at point 33 coincides with the second order transition point of the threads 18.

Figure 2:
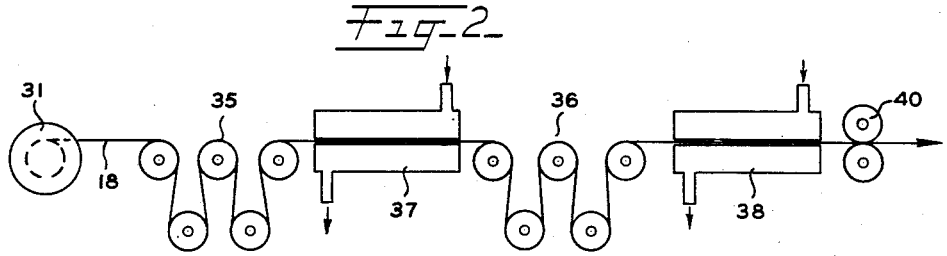
FIGURE 2 is an elevational view of one embodiment for the drawing and heating aspect of this invention.

With attention now directed to FIGURE 2 for further processing, note that thread 18 is unwound from reel 31 and passed around roller quintet 35, through heating chamber 37 and around roller quintet 36. Thread 18 is drawn by the difference in speeds of rotation of roller quintets 35 and 36 with roller quintet 36 rotating much faster than quintet 35. The speed differential is determined by conventional means and depends upon the desired degree of drawing. Roller quintets 35 and 36 may be replaced by other conventional drawing means such as by a supply roller and a draw roller.

Thread 18 passing through heating chamber 37 is heated by steam at 100° C., which steam flows in countercurrent direction to that of the thread travel. The length of heating chamber 37 may be any desired length as, for instance, about 80 centimeters. In conventional operations thread 18 after leaving roller quintet 36 is collected by conventional collection means. As pointed out previously, such conventional processing results in cracks on the thread surface after use. Thus an additional heating chamber 38 is provided through which thread 18 is passed by rollers 40. Chamber 38 is heated in the same fashion as chamber 37, i.e., by steam, but to a temperature of about 120° C. Tension is maintained on thread 18 in chamber 38 by rotating rollers 40 at a speed about 10% higher than that of roller quintet 36. Thread 18 from rollers 40 is collected on a reel or other conventional collection means (not shown).

In order that this invention may be better understood the following specific examples of one method of carrying out this invention are provided. It should be understood that such are offered only for the purposes of illustration and are not intended as limiting the scope of this invention.

EXAMPLE I

Granules of high molecular weight polyethylene terephthalate having a size of about 3 x 3 x 3 millimeters and a specific viscosity of 0.64 were melted under pressure in an atmosphere of nitrogen within extruder 10. They were extruded via the metering pump 15 through the spinning assembly 16 which was heated to 274° C. The spinning assembly contained a spinning plate 17 having an orifice 3 millimeters in diameter. The high molecular weight polyethylene terephthalate was extruded at about 35 grams per minute in a downward direction and introduced into cooling water 20 in vessel 21. The level 22 of cooling water 20 was about one centimeter from spinning plate 17. Three circular, non-rotatable thread guides 26, 27 and 28 were positioned in vessel 21 as is more clearly shown in FIGURE 1, and each had a diameter of about 20 centimeters. The thread was drawn around these guides by drawing off rollers 30 which rotated at a speed of 17.8 centimeters per minute. The unstretched thread having a diameter of 1.41 plus or minus 0.04 millimeters was wound on collection reel 31 which rotated at the same speed as rollers 30.

The thread was cooled by liquid 20 so that upon reaching point 33 it had a temperature corresponding to the second order transition point, or 69° C. This coincidence of point 33 with the thread second order transition point was accomplished by adjusting the position of guide 26 and the temperature of bath 20.

The liquid bath 20 was supplied first at a temperature of 19° C. and then at 31° C. to vessel 21, and the position of guide 26 was adjusted in bath 20 in such a fashion that point 33 varied in its distance below the level 22 of bath 20. The thread 18 was passed through bath 20 and over guide 26 in its various positions of adjustment and was tested for non-circularity. A portion of thread 18 of one meter length was selected and measurements were taken at points 10 centimeters apart. The averages found for the maximum and minimum diameters were obtained and the differences between these averages are shown for each depth of point 33 as non-circularity in the following tables. The greater the difference in averages the more non-circular were the threads.

Table I illustrates the results for the bath temperature at 19° C. and Table II for the temperature at 31° C. It was found that point 33 coincided with the second order transition point of thread 18 at a depth of 19 centimeters in the bath at 19° C. and at 26 centimeters in the bath at 31° C.

*Table I*

| Depth (cm.): | Non-circularity (mm.) |
| --- | --- |
| 10 | 0.184 |
| 12 | 0.116 |
| 15.5 | 0.060 |
| 16.5 | 0.050 |
| 18.5 | 0.037 |
| 19 | 0.025 |
| 20 | 0.080 |
| 21 | 0.155 |
| 22 | 0.250 |
| 23.5 | 0.436 |

*Table II*

| Depth (cm.): | Non-circularity (mm.) |
| --- | --- |
| 8 | 0.188 |
| 9 | 0.154 |
| 11.5 | 0.149 |
| 13 | 0.064 |
| 15.5 | 0.070 |
| 17 | 0.056 |
| 19 | 0.034 |
| 21.5 | 0.032 |
| 23 | 0.030 |
| 26 | 0.025 |
| 27 | 0.090 |
| 28.5 | 0.338 |
| 31 | 0.331 |

It can be seen from the foregoing tables that if point 33 coincides with the second order transition point of threads 18, that non-circularity of the threads is substantially eliminated. Thus denier variations and improved cross-sections of polyethylene terephthalate threads can be obtained.

EXAMPLE II

Polyethylene terephthalate thread prepared by the method of Example I was processed in the apparatus shown in FIGURE 2. The thread passing through chamber 37 having a length of 80 centimeters was heated to 100° C. by steam and was drawn 4.6 times its original length by roller quintets 35 and 36. The thread after leaving quintet 36 was passed through chamber 38 having a length of 80 centimeters and heated to 120° C. by steam. Rollers 40 were operated about 10% faster than quintet 36 in order that tension was applied to the thread in chamber 38.

The thread was tested after repeated bending and was found to be substantially free of fine cracks whereas threads which were only drawn contained many fine cracks on their surface.

From the foregoing it can be seen that improved polyalkylene terephthalate threads of heavy denier may be obtained simply and without much additional processing. Furthermore, threads of more uniform denier and cross-section are obtained by the process and apparatus of this invention.

The foregoing examples demonstrate the effectiveness of this invention on treating heavy denier polyethylene terephthalate threads. It should be understood that any high molecular weight polyalkylene terephthalate may be used equally well in this invention.

Various modifications may be made in the practice of this invention without departing from the spirit and scope of this invention which is to be limited only by the appended claims.

What is claimed is:

1. A process for manufacturing polyalkylene terephthalate threads comprising extruding molten polyalkylene terephthalate in the form of threads, immediately thereafter introducing said freshly spun polyalkylene terephthalate threads into a liquid cooling bath, passing said threads through said bath to solidify and cool the same, altering the passage of said thread through said bath where the temperature thereof corresponds to the second order transition point of said threads, removing said threads from said bath, and collecting the same.

2. A process for manufacturing polyalkylene terephthalate threads comprising extruding molten polyalkylene terephthalate in the form of threads, immediately thereafter introducing said freshly extruded polyalkylene terephthalate threads into a water cooling bath, passing said threads through said bath to solidify and cool the same, altering the passage of said thread through said bath where the temperature thereof corresponds to the second order transition point of said threads, maintaining constant tension on said threads prior to said passage alteration, removing said threads from said bath, and collecting the same.

3. A process for manufacturing polyethylene terephthalate threads comprising extruding molten polyalkylene terephthalate in the form of threads, immediately thereafter introducing said freshly extruded polyethylene terephthalate threads into a liquid bath maintained at a temperature below the second order transition point of said threads, passing said threads through said bath to solidify and cool the same, altering the passage of said thread through said bath where the temperature of said threads corresponds to the aforesaid second order transition point, removing said threads from said bath, and collecting the same.

4. A process for manufacturing polyethylene terephthalate threads comprising extruding molten polyalkylene terephthalate in the form of threads, immediately thereafter introducing said freshly extruded polyethylene terephthalate threads into a water bath maintained at a temperature below the second order transition point of said threads, passing said threads through said bath to solidify and cool the same, altering for the first time the passage of said thread through said bath where the temperature of said bath corresponds to the aforesaid second order transistion point, removing said threads from said bath, and collecting the same.

5. A process for manufacturing polyethylene terephthalate threads comprising extruding molten polyalkylene terephthalate in the form of threads, immediately thereafter introducing said freshly extruded polyethylene terephthalate threads into a water bath maintained at a temperature below the second order transition point, passing said threads through said bath to solidify and cool the same, maintaining a zone in said thread passage at the aforesaid second order transition point, altering the passage of said thread at said zone, maintaining constant tension on said thread until it reaches said zone, removing said thread from said bath, and collecting the same.

6. A process for manufacturing polyethylene terephthalate threads comprising extruding molten polyalkylene terephthalate in the form of threads, immediately thereafter introducing said freshly extruded polyethylene terephthalate threads into a water bath maintained at a temperature below the second order transition point, passing said threads through said bath to solidify and cool the same, maintaining a zone in said thread passage at the aforesaid second order transition point, altering the passage of said thread at said zone, maintaining constant tension on said thread until it reaches said zone, removing said thread from said bath and collecting the same, unwinding said collected thread, drawing said thread at about 100° C., heating said drawn thread to about 120° C. while held under tension, and thereafter recollecting said drawn and treated threads.

References Cited in the file of this patent

UNITED STATES PATENTS

| | | |
|---|---|---|
| 2,181,052 | Fryer | Nov. 21, 1939 |
| 2,323,383 | Dreyfus | July 6, 1943 |
| 2,543,027 | Jones | Feb. 27, 1951 |
| 2,581,922 | Spencer | Jan. 8, 1952 |

UNITED STATES PATENT OFFICE
CERTIFICATE OF CORRECTION

Patent No. 2,987,373                               June 6, 1961

Arie Bezemer et al.

It is hereby certified that error appears in the above numbered patent requiring correction and that the said Letters Patent should read as corrected below.

In the heading to the printed specification, between lines 8 and 9, insert -- Claims priority, application Great Britain Nov. 13, 1958 --.

Signed and sealed this 28th day of November 1961.

(SEAL)
Attest:

ERNEST W. SWIDER                         DAVID L. LADD
Attesting Officer                          Commissioner of Patents
                                                                           USCOMM-DC